United States Patent
Niitsuma (10) Patent No.: US 9,402,380 B2
(45) Date of Patent: Aug. 2, 2016

(54) DUAL-BEARING REEL PINION GEAR AND DUAL-BEARING REEL

(71) Applicant: Shimano Inc., Sakai, Osaka (JP)

(72) Inventor: Akira Niitsuma, Osaka (JP)

(73) Assignee: Shimano Inc., Osaka (JP)

( * ) Notice: Subject to any disclaimer, the term of this patent is extended or adjusted under 35 U.S.C. 154(b) by 34 days.

(21) Appl. No.: 14/548,697

(22) Filed: Nov. 20, 2014

(65) Prior Publication Data
US 2015/0181853 A1    Jul. 2, 2015

(30) Foreign Application Priority Data

Dec. 27, 2013  (JP) .................................. 2013-272697

(51) Int. Cl.
*A01K 89/01*     (2006.01)
*A01K 89/015*    (2006.01)
*A01K 89/00*     (2006.01)

(52) U.S. Cl.
CPC .............. *A01K 89/015* (2013.01); *A01K 89/006* (2013.01); *A01K 89/0189* (2015.05)

(58) Field of Classification Search
CPC ........... A01K 89/0186; A01K 89/0189; A01K 89/01901; A01K 89/015
See application file for complete search history.

(56) References Cited

U.S. PATENT DOCUMENTS

| | | | | |
|---|---|---|---|---|
| 5,855,330 A * | 1/1999 | Kobayashi | ........... | A01K 89/015 242/261 |
| 6,102,316 A * | 8/2000 | Nilsen | ................. | A01K 89/015 242/255 |
| 6,199,782 B1 * | 3/2001 | Oishi | ................... | A01K 89/015 242/290 |
| 6,270,028 B1 * | 8/2001 | Kim | .................... | A01K 89/015 242/262 |
| 2011/0180647 A1 * | 7/2011 | Niitsuma | ............. | A01K 89/033 242/307 |
| 2012/0018562 A1 * | 1/2012 | Takamatsu | ........... | A01K 89/015 242/307 |
| 2012/0048981 A1 * | 3/2012 | Ohara | ................ | A01K 89/0108 242/230 |
| 2013/0193250 A1 * | 8/2013 | Ikebukuro | ............ | A01K 89/015 242/261 |
| 2015/0090822 A1 * | 4/2015 | Ikuta | .................... | A01K 89/015 242/261 |
| 2015/0115087 A1 * | 4/2015 | Ohara | ................ | F16C 32/0406 242/223 |

FOREIGN PATENT DOCUMENTS

JP          2009-82027 A      4/2009

* cited by examiner

*Primary Examiner* — Emmanuel M Marcelo
(74) *Attorney, Agent, or Firm* — Global IP Counselors (57) ABSTRACT

In the present dual-bearing reel, a pinion gear has a body, a first support part, a second support part, a gear part and a narrowed part. The first support part is disposed on a first end side of the body. The second support part is disposed on a second end side of the body. The gear part is disposed so as to be spaced from the first support part at an interval between the first support part and the second support part. The narrowed part is disposed between the first support part and the gear part. The narrowed part includes an outer diameter greater than an outer diameter of the second support part and less than a root circle diameter of the gear part.

3 Claims, 9 Drawing Sheets

FIG. 10

DUAL-BEARING REEL PINION GEAR AND DUAL-BEARING REEL

CROSS-REFERENCE TO RELATED APPLICATIONS

This application claims priority to Japanese Patent Application No. 2013-272697 filed on Dec. 27, 2013, the entirety of which is hereby incorporated by reference in its entirety.

BACKGROUND

1. Field of the Invention

The present invention relates to a pinion gear for a dual-bearing reel, particularly to a pinion gear that is meshed with a drive gear configured to transmit rotation of a handle to a spool and is configured to function as a clutch control mechanism by moving in a spool shaft direction. Further, the present invention relates to a dual-bearing reel including the pinion gear.

2. Background Information

In a dual-bearing reel, a pinion gear functions as a clutch control mechanism as described above and a rotation transmission mechanism (see Japan Laid-open Patent Application Publication No. JP-A-2009-82027). The clutch control mechanism is configured to be switched between a coupled state, transmitting rotation of a handle to a spool and a decoupled state, blocking transmission of the rotation. The clutch control mechanism is composed of a clutch pin and a tubular pinion gear. The clutch pin is mounted to a spool shaft. The pinion gear has a groove configured engage the clutch pin. On the other hand, the rotation transmission mechanism is configured to rotate the spool, while the pinion gear is meshed with a drive gear configured to be rotated in conjunction with the handle.

The pinion gear is mounted on the outer peripheral side of the spool shaft so as to be rotatable and axially movable. The pinion gear has two support parts on both axial ends thereof. The support parts are supported by bearings. Further, the pinion gear has a gear part in the center part thereof. The gear part is meshed with the drive gear. In other words, the gear part is disposed between the two support parts. The gear part is disposed at an interval from the support part disposed on a first end side (hereinafter referred to as a first support part), while being disposed adjacently to the support part disposed on a second end side (hereinafter referred to as a second support part). Yet further, the pinion gear has a clutch control part between the gear part and the first support part. The clutch control part enables a clutch plate to be engaged therewith.

The well-known pinion gear includes the clutch control part to be engaged with the clutch plate. The clutch control part has an annular groove shape and is disposed between the gear part and the bearing disposed on the one end side. In other words, the clutch control part is a narrowed part of the pinion gear.

In this type of pinion gear, the part between the gear part and an engaging part (including the groove) of the clutch mechanism, i.e., the narrowed part for transmitting power (torque) is thinly formed and has the smallest diameter Thus, the narrowed part is likely to be deformed (distorted or flexed). When the narrowed part is deformed, errors can be caused when meshing with the gear part. This may result in a deterioration in the gear feeling. Chances are that the tooth root of the gear part interferes with the narrowed part and this tendency becomes significant, especially, where the root circle diameter of the gear part is less than the outer diameter of the narrowed part.

Similarly, the second support part, disposed adjacently to the gear part, is also required to have a shape with a diameter less than the root circle diameter of the gear part in order to avoid interference with the tooth root of the gear part. When the second support part is thus structured, the pinion gear can be smoothly supported at the second support part during its rotation and a clutch action can be smoothly performed. The drive gear is herein meshed with the gear part, while the pinion gear is supported at both ends thereof, i.e., the first and second support parts. Hence, chances are that the narrowed part is significantly flexed where the narrowed part has a shape with a diameter less than that of the second support part.

SUMMARY

The present invention has been produced in view of the aforementioned drawback. It is an object of the present invention to enhance stiffness of a pinion gear and simultaneously enhance gear feeling in a dual-bearing reel.

A pinion gear for a dual-bearing reel according to a first aspect of this invention is configured to mesh with a drive gear and function as a clutch mechanism by moving in a direction of a spool shaft. The drive gear is configured to transmit rotation of a handle to a spool. The handle is rotatably mounted to a reel unit for the dual-bearing reel.

The present pinion gear includes a body, a first support part, a second support part, a gear part and a clutch control part. The body has a tubular shape. The spool shaft is disposed in an inner peripheral part of the body. The first support part is disposed on a first end side of the body. The first support part is configured to be supported by the reel unit through a first bearing so as to be rotatable and axially movable. The second support part is disposed on a second end side of the body. The second support part is configured to support by the reel unit through a second bearing so as to be rotatable and axially movable. The gear part is disposed away from the first support part at an interval between the first support part and the second support part. The gear part is configured to mesh with the drive gear. The clutch control part is disposed between the first support part and the gear part. The clutch mechanism includes the clutch control part. The clutch control part includes an outer diameter that is greater than an outer diameter of the second support part and is less than a root circle diameter of the gear part.

The present pinion gear is formed such that the outer diameter of the clutch control part is greater than that of the second support part. Hence, the clutch control part is less likely to be deformed (distorted or flexed) even when a drive gear is meshed with the gear part between the first support part and the second support part. In other words, according to the present structure, the clutch control part can have an enhanced stiffness. In addition, the gear feeling can be enhanced by inhibiting deformation (distortion or flexure) of the clutch control part. Further, the pinion gear is formed such that the outer diameter of the clutch control part is less than the root circle diameter of the gear part. Hence, the clutch control part can avoid interfering with the gear part, and the gear feeling can be enhanced.

A pinion gear for a dual-bearing reel according to a second aspect of the invention relates to the pinion gear recited in the first aspect of the invention. The gear part includes a module which is greater than or equal to 0.1 and less than or equal to 0.4. The module is herein defined by dividing a pitch circle diameter of the gear part by the number of teeth of the gear part.

In the present pinion gear, the gear part is formed such that the module thereof falls in a range of greater than or equal to 0.1 and less than or equal to 0.4. In other words, the module of the gear part is much less than that of the gear part of a well-known pinion gear. Thus, the gear part of the present pinion gear can be formed such that the root circle diameter thereof is greater than that of the gear part of the well-known pinion gear. With the structure, the root circle diameter of the gear part can be prevented from interfering with the clutch control part, even when the outer diameter of the clutch control part is greater than that of the second support part. In other words, the gear feeling can be enhanced.

A dual-bearing reel according to a third aspect of the invention is configured to forwardly reel out a fishing line. The present dual-hearing reel includes a reel unit, a handle, a spool, a spool shaft, a rotation transmission mechanism, a clutch control mechanism, a first bearing and a second bearing. The handle is rotatably disposed on a lateral part of the reel unit. The spool is configured to wind the fishing line and is rotatably supported by the reel unit. The spool shaft is mounted to the spool. The rotation transmission mechanism is configured to transmit rotation of the handle to the spool. The rotation transmission mechanism includes a drive gear and the pinion gear.

The drive gear is configured to be rotatable in conjunction with the handle. The pinion gear is the one recited in the aforementioned first and second aspects of the invention. The clutch control mechanism is configured to set in either a coupled state or a decoupled state. The handle and the spool is coupled to each other in the coupled state. The handle and the spool is decoupled from each other in the decoupled state. The first bearing is mounted to the reel unit. The first bearing supports the first support part rotatably and movably in an axial direction. The second bearing is mounted to the reel unit. The second bearing supports the second support part rotatably and movably in the axial direction.

According to the present dual-bearing reel, the pinion gear is structured similarly to that descried in the aforementioned first and second aspects of the invention. Thus, the present dual-bearing reel can achieve advantages effects similar to those achieved by the aforementioned dual-bearing reel.

According to the present invention, it is possible to enhance stiffness of a pinion gear and enhance gear feeling.

BRIEF DESCRIPTION OF THE DRAWINGS

Referring now to the attached drawings which form a part of this original disclosure.

DETAILED DESCRIPTION OF EMBODIMENTS

Figure 1:
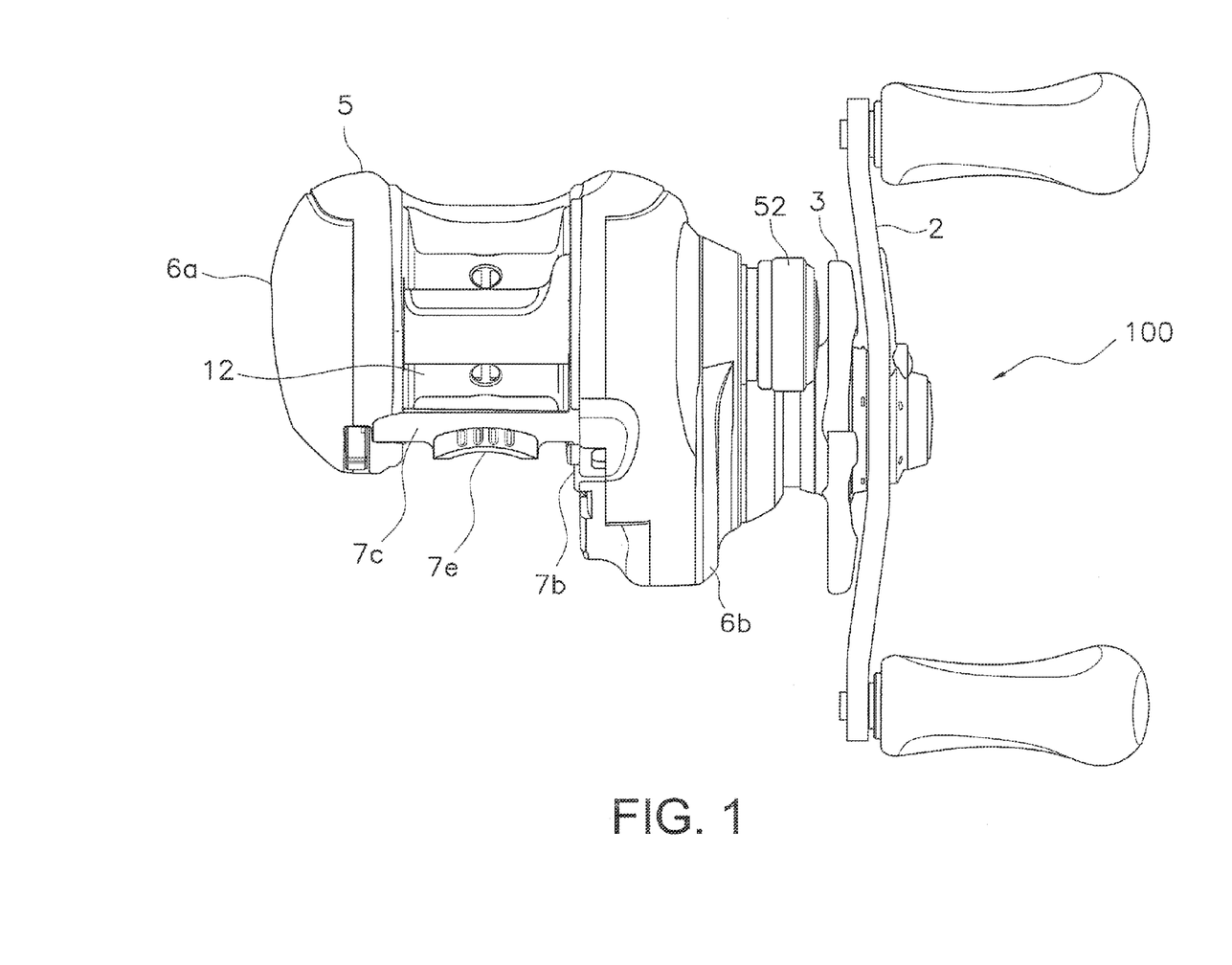
FIG. 1 is a rear view of a dual-bearing reel according to an exemplary embodiment of the present invention.
Figure 2:
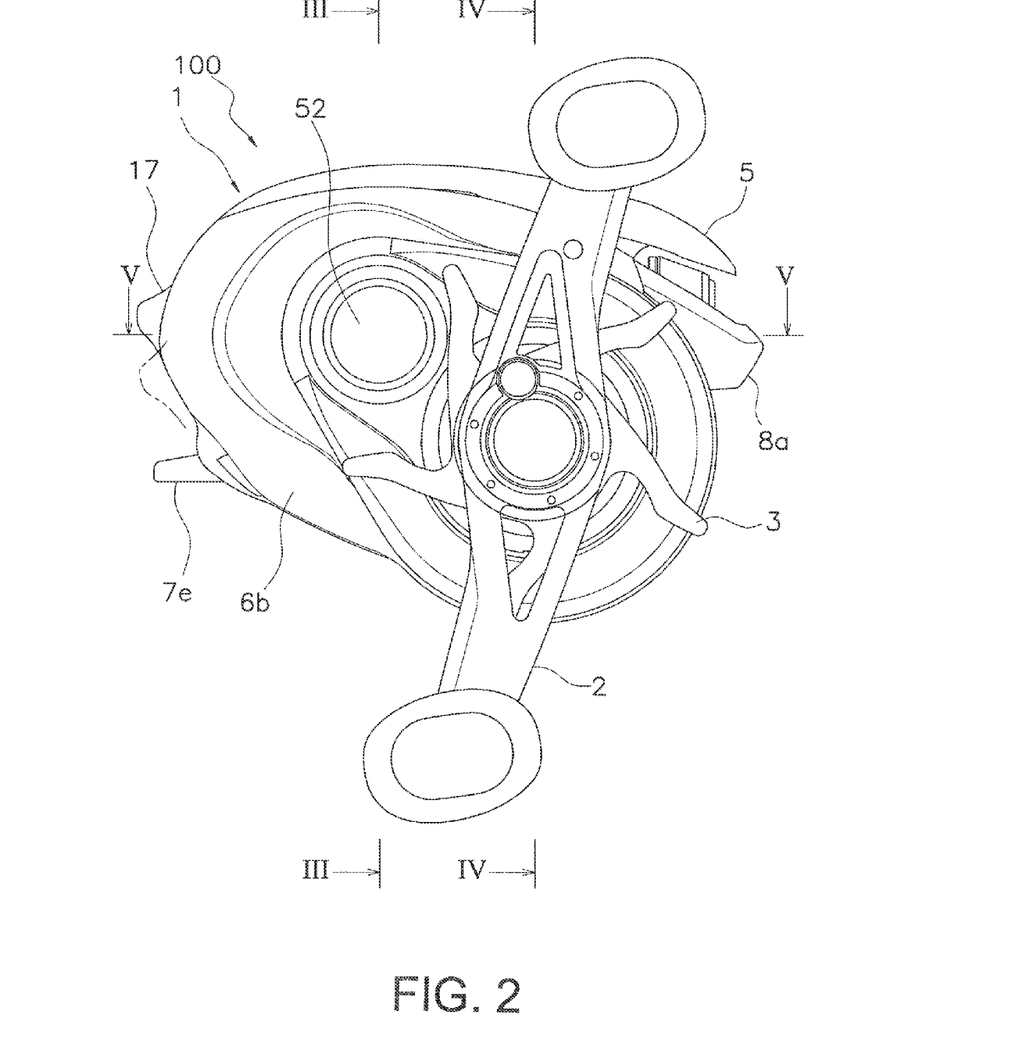
FIG. 2 is a side view of the dual-bearing reel seen from a handle side.

A dual-beating reel 100 is configured to forwardly reel out a fishing line. As illustrated in FIGS. 1 and 2, the dual-bearing reel 100 is a compact low-profile reel for bait-casting. The dual-bearing reel 100 includes a reel unit 1, a handle 2 for spool rotation and a star drag 3 for drag regulation. The handle 2 is rotatably disposed laterally to the reel unit 1. The star drag 3 is disposed on the same side as the reel unit 1 with respect to the handle 2. The dual-bearing reel 100 further includes a spool 12 for winding a fishing line, a spool shaft 16, a rotation transmission mechanism 18, a clutch mechanism 13 and a drag mechanism 21.

<Reel Unit>

As illustrated in FIGS. 1, 3, 4, 5 and 6, the reel unit 1 includes a frame 5, a first side cover 6a and a second side cover 6b. The first and second side covers 6a and 6b cover both lateral sides of the frame 5. The reel unit 1 further includes a front cover 8a and a shaft strut portion 8b. The front cover 8a covers the front side of the frame 5. The shaft strut portion 8b is fixed to the first side cover 6a by screws or so forth.

The frame 5 includes a first side plate 7a, a second side plate 7b and a plurality of coupling parts 7c. The first side plate 7a is disposed on the opposite side of the handle 2. The second side plate 7b is disposed on the same side as the handle 2, while being opposed to the first side plate 7a. The coupling parts 7c couple the first side plate 7a and the second side plate 7b. The first side plate 7a has an opening 7d bored so as to enable the spool 12 to pass therethrough. The shaft strut portion 8b is detachably coupled to the opening 7d. The upper side one of the coupling parts 7c is used as a thumb rest. The lower side one of the coupling parts 7c is integrally formed with a fishing-rod attachment part 7e.

Figure 6:
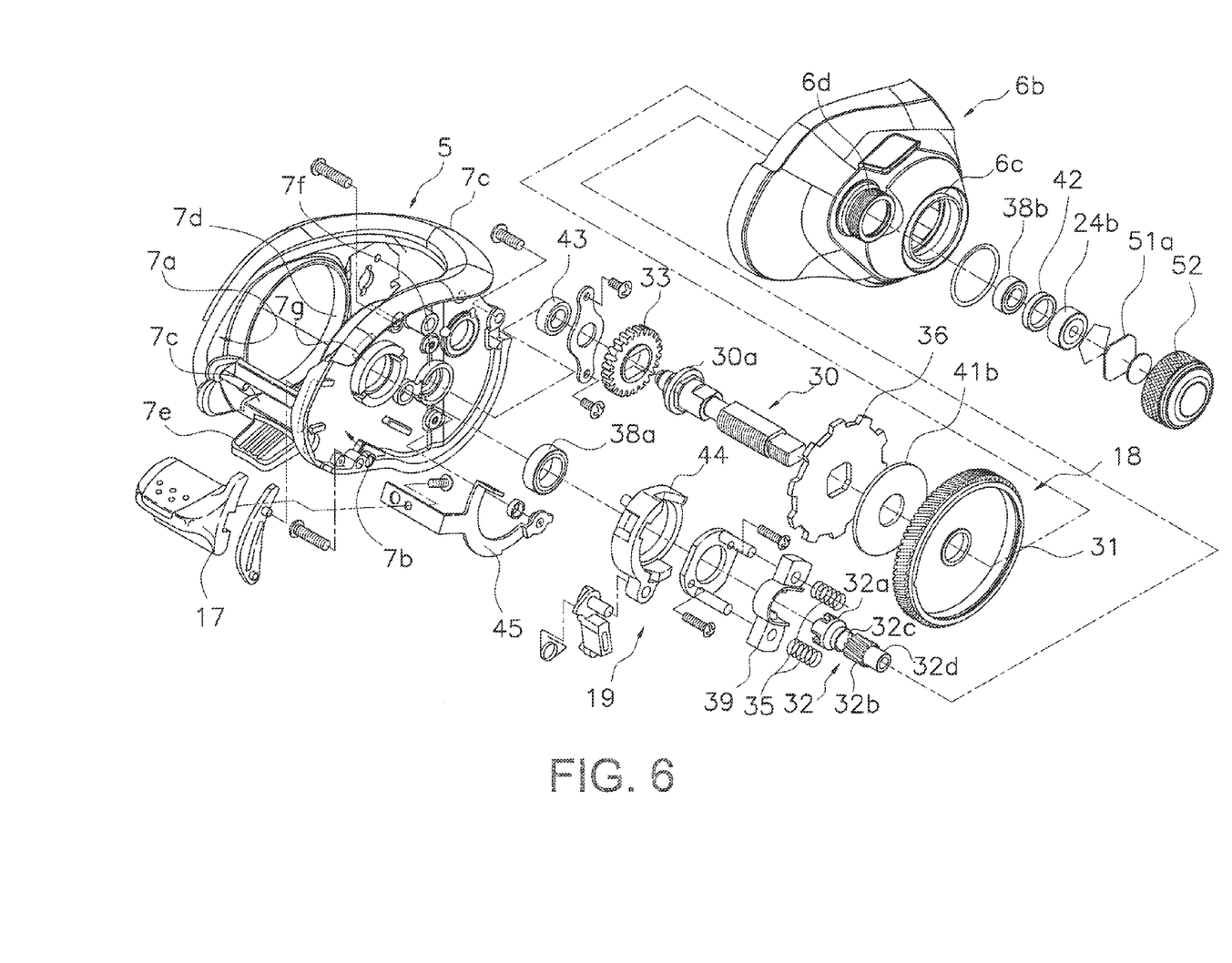
FIG. 6 is an exploded perspective view including a rotation transmission mechanism and a clutch control mechanism.

The spool 12 for winding the fishing line is rotatably and detachably mounted between the first and second side plates 7a and 7b of the reel unit 1. As illustrated in FIG. 6, a first boss 7f and a second boss 7g are formed on the second side plate 7b. Each of the first and second bosses 7f and 7g has a through hole. The first boss 7f supports the base end of a drive shaft 30 (to be described) onto which the handle 2 is coupled such that the drive shaft 30 is rotatable. The second boss 7g supports a pinion gear 32 such that the pinion gear 32 is rotatable and axially movable.

Figure 4:
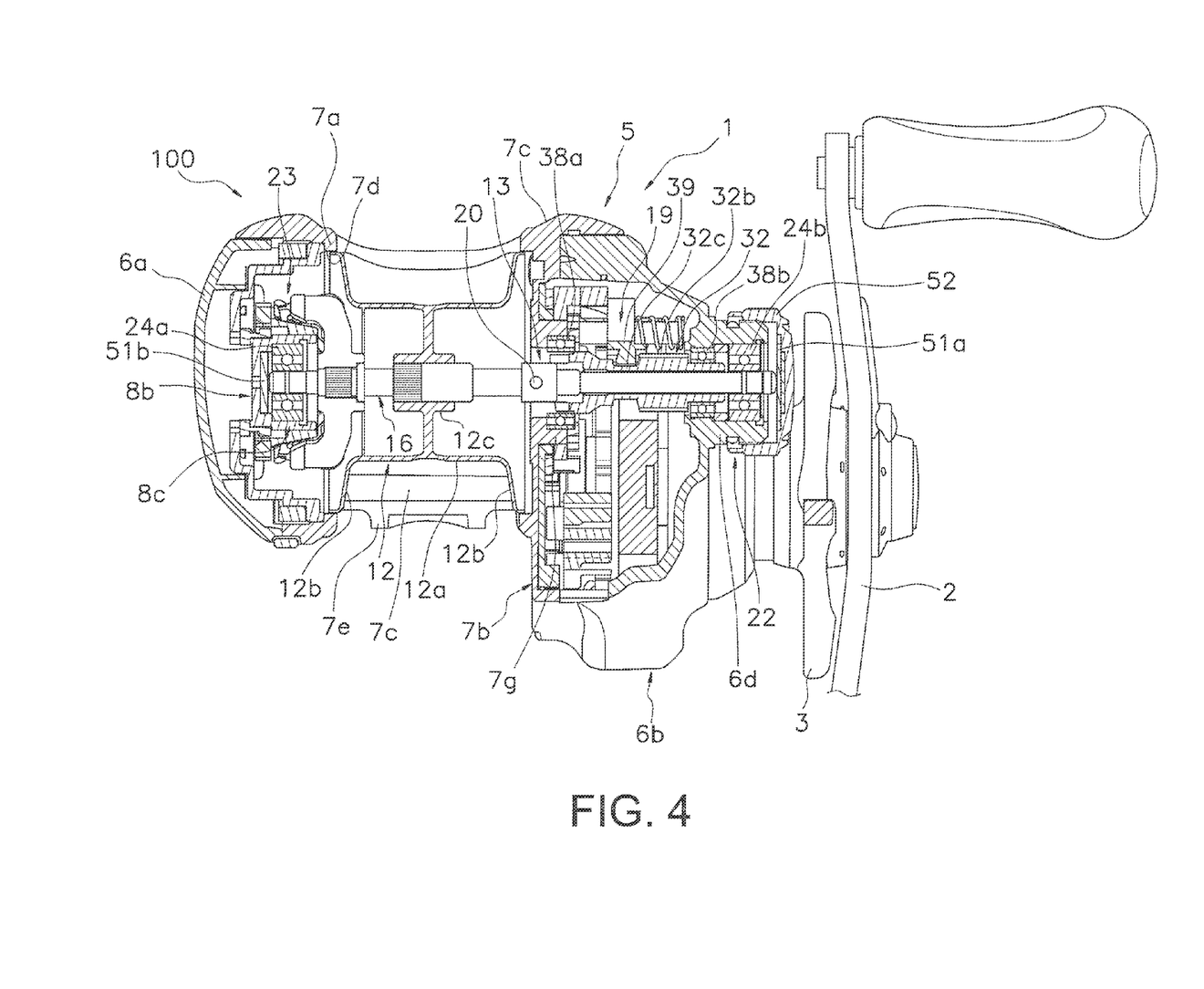
FIG. 4 is a cross-sectional view of FIG. 2 taken along a cutaway line IV-IV.

As illustrated in FIG. 4, the first side cover 6a is detachably coupled to the first side plate 7a through the shaft strut portion 8b. As illustrated in FIG. 6, the second side cover 6b has a third boss 6c and a fourth boss 6d. The third boss 6c supports the drive shaft 30 in a rotatable state. The fourth boss 6d supports the pinion gear 32 and the spool Shaft 16 onto which the spool 12 is fixed.

As illustrated in FIG. 4, the shaft strut portion 8b is a closed-end tubular member. The shaft strut portion 8b has a tubular bearing accommodating part 8c in the inner peripheral part thereof. The bearing accommodating part 8c accommodates a bearing 24a in the interior thereof. The bearing 24a supports one end of the spool shaft 16.

Figure 3:
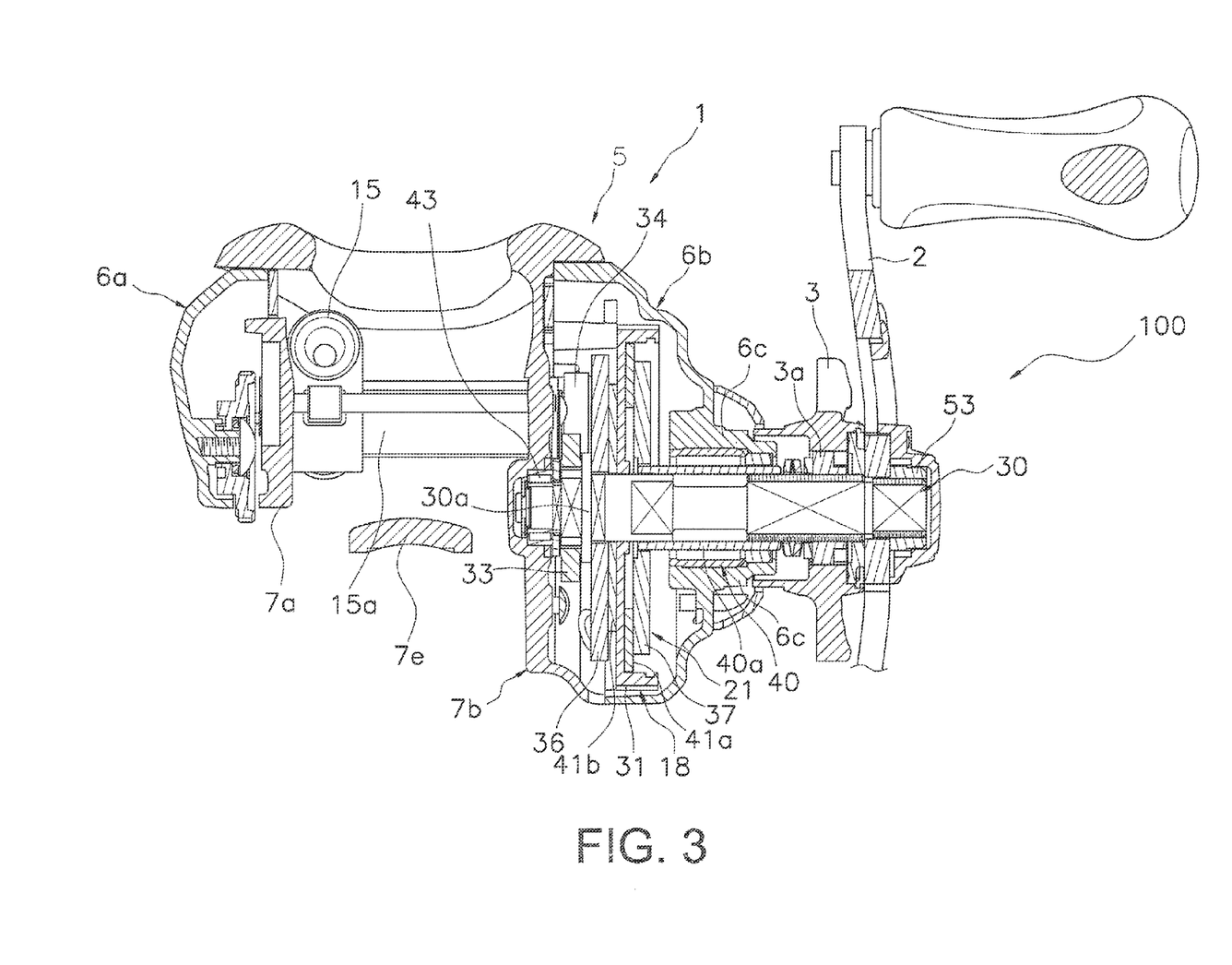
FIG. 3 is a cross-sectional view of FIG. 2 taken along a cutaway line III-III.
Figure 5:
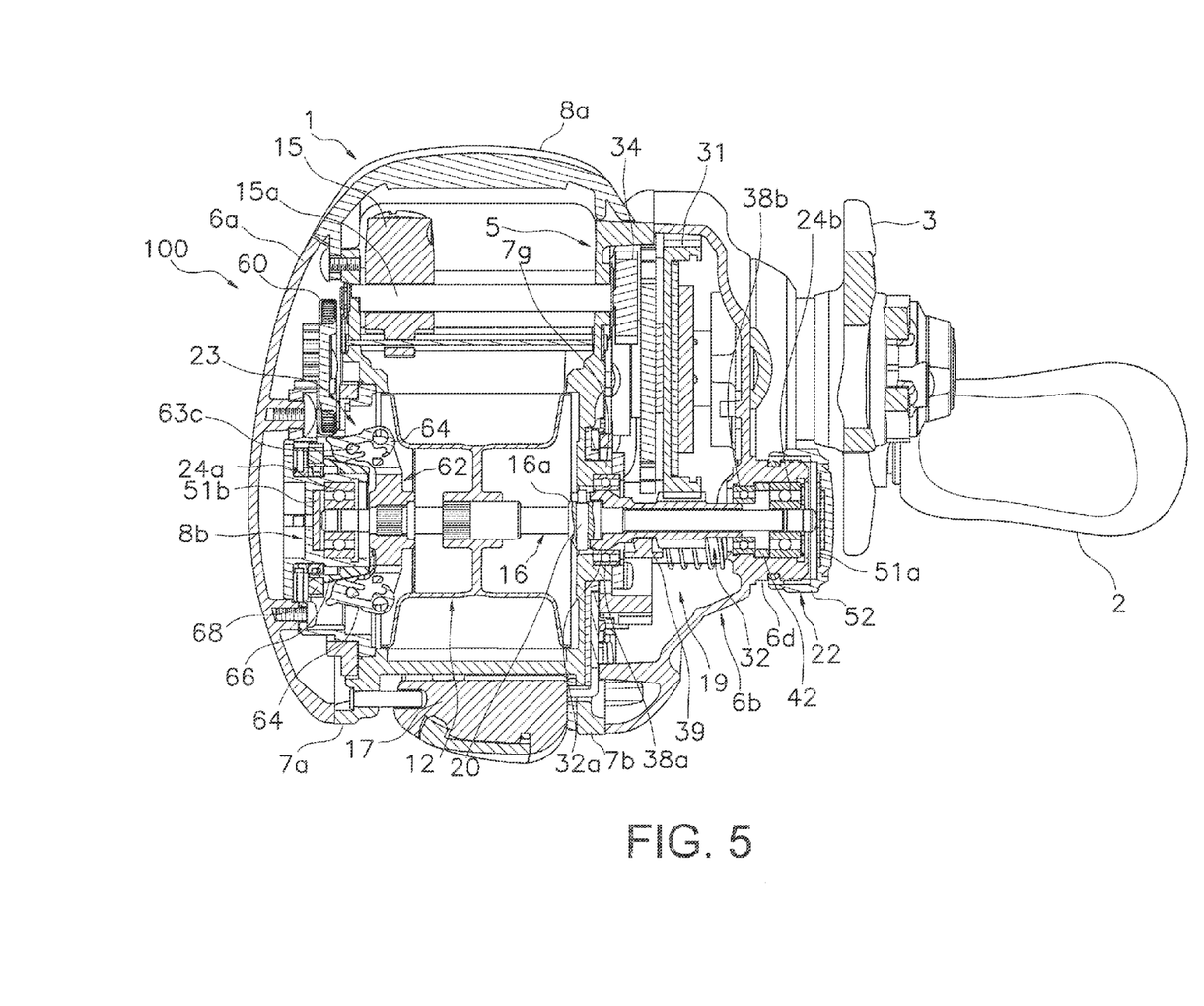
FIG. 5 is a cross-sectional view of FIG. 2 taken along a cutaway line V-V.

As illustrated in FIGS. 3, 4 and 5, the spool 12, a level wind mechanism 15 and a clutch operating member 17 are disposed between the first side plate 7a and the second side plate 7b. The level wind mechanism 15 is configured to evenly wind the fishing line about the spool 12. The clutch operating member 117 serves as a thumb rest in thumbing the fishing line. The clutch operating member 17 performs the operation of switching the clutch mechanism 13 between a coupled state and a decoupled state by pivoting about the spool shaft 16. The clutch operating member 17 is configured to pivot between a clutch-on position and a clutch-off position. In FIG. 2, the clutch-on position is depicted with a solid line, whereas the clutch-off position is depicted with a dashed two-dotted line.

As illustrated in FIGS. 3, 4 and 5, the rotation transmission mechanism 18, the clutch mechanism 13, a clutch control mechanism 19, the drag mechanism 21 and a casting control mechanism 22 are disposed between the second side plate 7b and the second side cover 6b.

The rotation transmission mechanism 18 is a mechanism configured to transmit the rotation of the handle 2 to the spool 12. The rotation transmission mechanism 18 is also a mechanism configured to transmit the rotation of the handle 2 to the level wind mechanism 15. It should be noted that the structure of the rotation transmission mechanism 18 will be described below.

The clutch mechanism 13 is a mechanism configured to be set in either the coupled state or the decoupled state. In the coupled state, the handle 2 and the spool 12 are coupled to each other. In the decoupled state, the handle 2 and the spool 12 are decoupled from each other. It should be noted that the structure of the clutch mechanism 13 will be explained in the following section "Spool and Spool Shaft".

The clutch control mechanism 19 is a mechanism configured to engage/disengage and control the clutch mechanism 13 in response to the operation of the clutch operating member 17. As illustrated in FIG. 6, the clutch control mechanism 19 has a heretofore known structure composed of a clutch yoke 39, a clutch cam 44 and a clutch plate 45.

The casting control mechanism 22 is a brake mechanism configured to regulate a resistive force to be applied during the rotation of the spool 12. Further, a spool brake device 23 is disposed between the first side plate 7a and the first side cover 6a. The spool brake device 23 is a device configured to brake the spool 12 by centrifugal force. The spool brake device 23 is a device configured to inhibit the occurrence of backlash in casting. It should be noted that the structure of the casting control mechanism 22 will be described below.

The drag mechanism 21 is configured to brake the rotation of the spool 12 in a fishing-line releasing direction through a drive gear 31 when the clutch mechanism 13 is set in the coupled state. It should be noted that the structure of the drag mechanism 21 will be described below.

<Spool and Spool Shaft>

As illustrated in FIG. 4, the spool 12 is rotatably supported by the reel unit 1. The spool 12 has a bobbin trunk 12a, a pair of right and left flanges 112h and a boss 12c. The bobbin trunk 12a is a tubular part having an outer periphery; around which that the fishing line is wound. The flanges 12b are integrally formed on both axial ends of the bobbin trunk 12a, while respectively protruding in the radially outward direction. The boss 12c is fixed onto the spool shaft 16 by an arbitrary fixation method such as press-fitting. Thus, the spool 12 is coupled to the spool shaft 16 so as to be unitarily rotatable therewith.

The spool shaft 16 is disposed through the spool 12. As illustrated in FIGS. 4 and 5, the spool shaft 16 extends outwardly relative to the second side cover 6b, while penetrating through the second side plate 7b. One end of the spool shaft 16 is rotatably supported by the bearing 24a accommodated in the bearing accommodating part 8c of the shaft strut portion 8b. On the other hand, the other end of the spool shaft 16 is rotatably supported by a bearing 24b within the fourth boss 6d disposed on the second side cover 6b. Thus, the spool shaft 16 is supported by the reel unit 1 through the bearings disposed in two positions.

The spool shaft 16 penetrates through the second boss 7g of the second side plate 7b. A clutch pin 20, composing a part of the clutch mechanism 13, is fixed to the part of the spool shaft 16 that penetrates through the second boss 7g. The clutch pin 20 is an exemplary clutch portion composing a part of the clutch mechanism 13. The clutch pin 20 penetrates through the spool shaft 16 along the radial direction of the spool shaft 16, while both ends thereof protrude from the spool shaft 16 in the radial direction. A pin penetrating part 16a, i.e., the part of the spool shaft 16 that the clutch pin 20 penetrates through, has a large diameter similar to a part of the spool shaft 16 onto which the spool 12 is fixed.

<Rotation Transmission Mechanism>

As illustrated in FIG. 3, the rotation transmission mechanism 18 includes the drive shaft 30, the drive gear 31, the pinion gear 32 (see FIGS. 4, 5 and 6), a first gear 33 and a second gear 34. The drive shaft 30 is a member with the handle 2 coupled thereto in a unitarily rotatable state. The drive gear 31 is mounted to the drive shaft 30. The pinion gear 32 is meshed with the drive gear 31. The first gear 33 is coupled to the drive shaft 30 so as to be unitarily rotatable therewith. The second gear 34 is meshed with the first gear 33. The second gear 34 reciprocates the level wind mechanism 15 right and left in conjunction with the rotation of the handle 2.

The drive shaft 30 is made of, for instance, stainless alloy. As illustrated in FIGS. 3 and 6, the drive shaft 30 has a brimmed part 30a with a large diameter. The drive shaft 30 is rotatably supported by the reel unit 1 through a bearing 43 and a one-way clutch 40. The bearing 43 is mounted to the first boss 7f of the second side plate 7b. The one-way clutch 40 is mounted to the third boss 6c of the second side cover 6b. The drive shaft 30 rotatable only in a fishing-line winding direction by the one-way clutch 40 of a roller type. A ratchet wheel 36 is mounted onto the drive shaft 30 so as to be unitarily rotatable therewith. The ratchet wheel 36 serves as a drag receiver member for receiving the drag force of the drag mechanism 21. The ratchet wheel 36 is disposed between the drive gear 31 and the brimmed part 30a. The ratchet wheel 36 functions not only as the drag receiver member but also as a clutch returning mechanism configured to return the clutch mechanism 13 from the decoupled state to the coupled state. Further, the ratchet wheel 36 also functions as a pawl-type one-way clutch disposed in alignment with the one-way clutch 40.

As illustrated in FIG. 3, the drive gear 31 is rotatably mounted to the drive shaft 30. A drag plate 37 of the drag mechanism 21 is also mounted to the drive shaft 30 so as to be unitarily rotatable therewith. Further, a drag nut 3a of the star drag 3 is screwed onto the drive shaft 30. Yet further, the handle 2 is mounted to the tip end of the drive shaft 30 so as to be unitarily rotatable therewith. A nut 53 is also screwed onto the tip end of the drive shaft 30 in order to fix the handle 2 to the drive shaft 30. Thus, the drive gear 31 is rotatable in conjunction with the handle 2. On the other hand, the first gear 33 is mounted to the base end of the drive shaft 30 so as to be unitarily rotatable therewith. As illustrated in FIG. 5, the second gear 34 is coupled to a worm shaft 15a of the level wind mechanism 15 so as to be unitarily rotatable therewith.

As illustrated in FIGS. 4 to 7, the pinion gear 32 is meshed with the drive gear 31 configured to transmit the rotation of the handle 2 to the spool 12. Further, the pinion gear 32 is configured to move in the extending direction of the spool shaft 16, and thus functions as the clutch mechanism 13.

The pinion gear 32 is a member made of metal, for instance, stainless alloy; brass alloy or so forth. The pinion gear 32 is a tubular member with a stepped through hole 32h, and thus enables the spool shaft 16 to penetrate through the center thereof. Both ends of the pinion gear 32 are rotatably supported by the reel unit 1. Specifically, one end of the pinion gear 32 is rotatably supported by the second boss 7g of the second side plate 7b through a bearing 38a, whereas the other end of the pinion gear 32 is rotatably supported by the fourth boss 6d of the second side cover 6b through a bearing 38b.

The bearing 38a is mounted to the reel unit 1. The bearing 38a supports a first support part 32a, to be described, so as to make the first support part 32a rotatable and axially movable. The bearing 38b is mounted to the reel unit 1. The bearing 38b supports a second support part 32d, to be described, so as to make the second support part 32d rotatable and axially movable. The bearing 38a is an example of a first bearing, whereas the bearing 38b is an example of a second bearing.

As described above, both ends of the pinion gear 32 are supported by the reel unit 1. Hence, the pinion gear 32 is unlikely to slant and does not make contact with the spool shaft 16. As a result, the rotation speed of the spool 12 is unlikely to be decelerated in free rotation.

Figure 7:
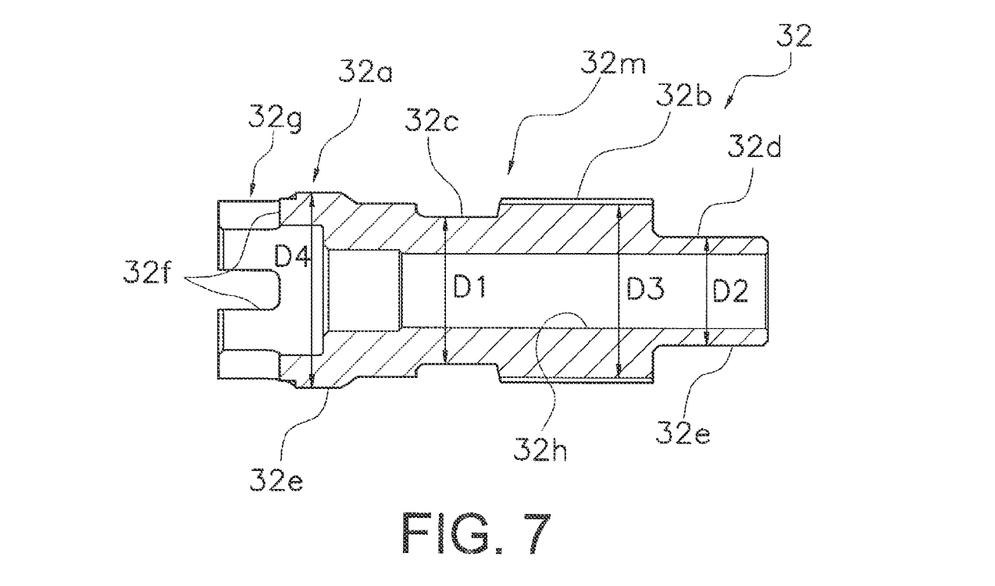
FIG. 7 is a cross-sectional view of a pinion gear.
Figure 8:
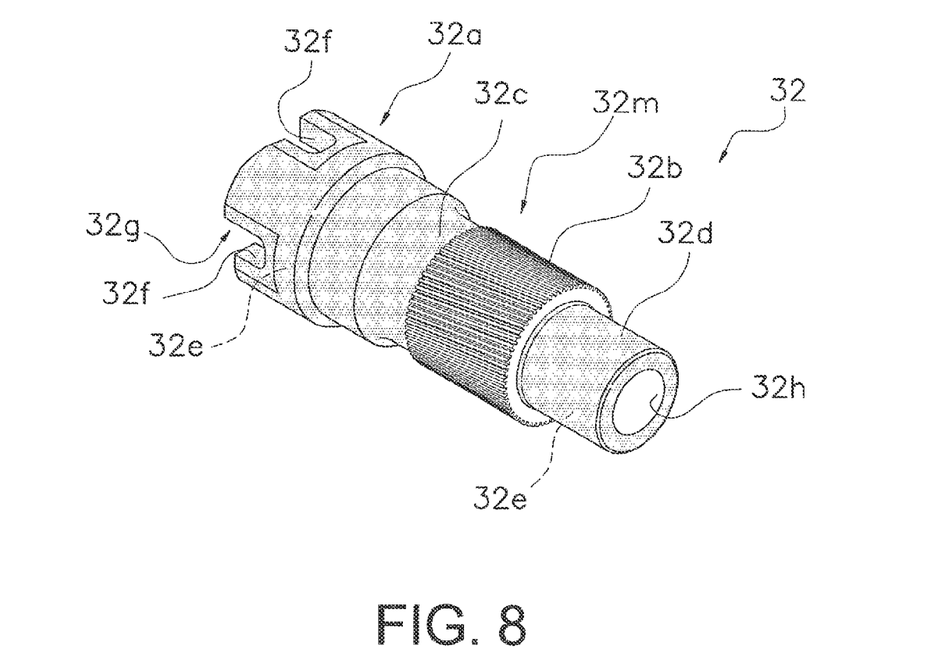
FIG. 8 is a perspective view of the pinion gear.

The pinion gear 32 is also movable in a spool shaft direction, while being supported by the reel unit 1 through the bearings 38a and 38b. As illustrated in FIGS. 6, 7 and 8, the pinion gear 32 has a body 32m, the first support part 32a, a gear part 32b, a narrowed part 32c, the second support part 32d and a plated coating 32e. The narrowed part 32c is an example of a clutch control part.

The body 32m has a tubular shape. The body 32m has the first support part 32a on one end thereof. The body 32m has the second support part 32d on the other end thereof. The body 32m has the gear part 32b and the narrowed part 32c on the middle part thereof. Detailed explanation will be made below fir the first support part 32a, the gear part 32b, the narrowed part 32c and the second support part 32d.

The first support part 32a is disposed on one end of the body 32m. Specifically, the first support part 32a is disposed on one end of the body 32m and is supported by the reel unit 1 (the second boss 7g of the second side plate 7b) through the bearing 38a so as to be rotatable and axially movable.

The first support part 32a has a clutch engaging part 32g. The clutch engaging part 32g has a plurality of engaging grooves 32f that the clutch pin 20 is engaged therewith. The engaging grooves 32f are formed along the radial direction of the pinion gear 32. For example, two engaging grooves 32f are formed along the radial direction, while intersecting with each other at an angle of 90 degrees.

Figure 10:
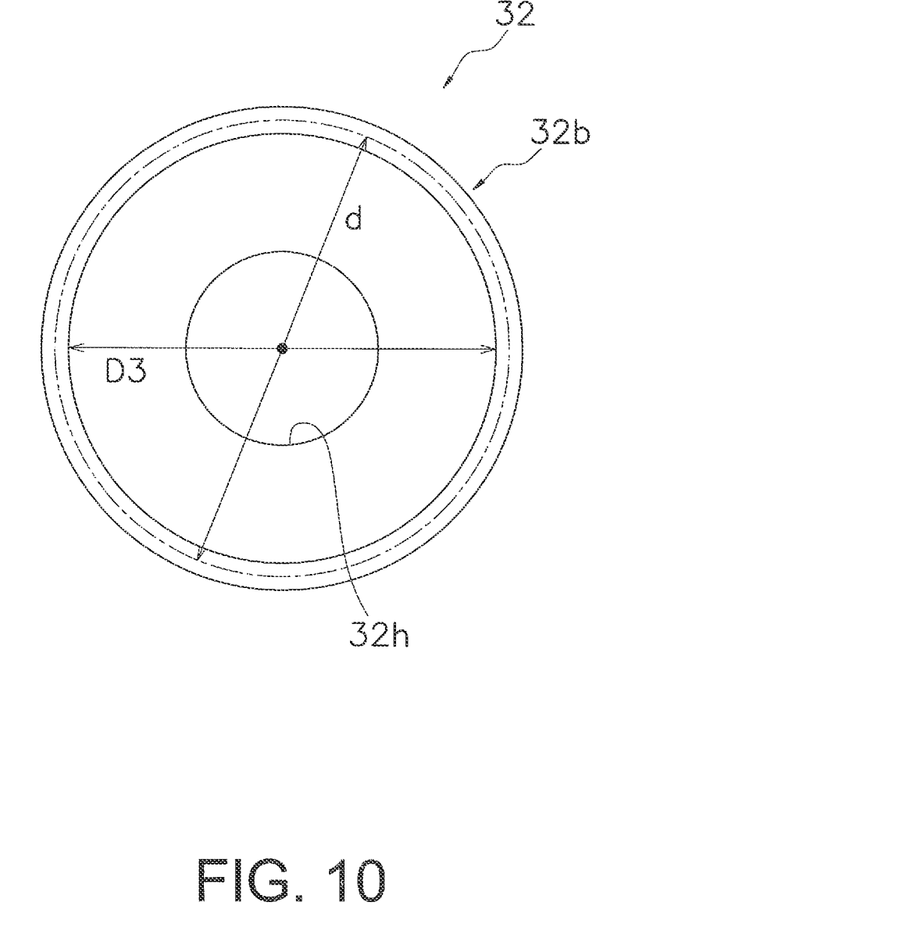
FIG. 10 is a schematic view of a gear part for explaining the module.

The gear part 32b is disposed at an interval from the first support part 32a. The gear part 32b is meshable with the drive gear 31. Specifically the gear part 32b is formed such that the module (M) thereof (the pitch circle diameter (d)/the number of teeth (z)) falls in a range of greater than or equal to 0.1 and less than or equal to 0.4. In short, the module is set to be in a range of "$0.1 \leq M(=d/z) \leq 0.4$". As illustrated in FIG. 10, the pitch circle diameter d is an imaginary diameter of the gear part 32b. It should be noted that the maximum circle in FIG. 10 indicates an addendum circle (a tooth-tip circle) of the gear part 32b. It should be also noted that the teeth formed on the outer periphery of the gear part 32b are not depicted in FIG. 10.

Further, as described above, the gear part 32b is meshed with the drive gear 31. Thus, similarly to the gear part 32b, the module (m) of the drive gear 31 is also set to be in a range of "$0.1 \leq m(=d/z) \leq 0.4$".

Yet further, the gear part 32b is formed after processing of a blank (to be the pinion gear 32) is finished except for the gear part 32b. When described in detail, a blank is firstly processed except for the gear part 32b. Next, the plated coating 32e is formed on the blank (to be the pinion gear 32) with the through hole 32h being closed. Finally, the gear part 32b is processed with an arbitrary type of machining such as hobbing (gear cutting). Thus, the plated coating 32e is not formed on the gear part 32b.

The narrowed part 32c composes a part of the clutch mechanism 13. The narrowed part 32c is disposed between the first support part 32a and the gear part 32b. The outer diameter (D1) of the narrowed part 32c is less than that of the first support part 32a. When described in detail, the outer diameter (D1) of the narrowed part 32c is less than the maximum diameter (D4) of the first support part 32a (i.e., D4>D1). Further, the outer diameter (D1) of the narrowed part 32c is greater than that (D2) of the second support part 32d (i.e., D1>D2). Yet further, the outer diameter (D1) of the narrowed part 32c is less than the root circle diameter (D3) of the gear part 32b (i.e., D1<D3). In other words, the outer diameter (D1) of the narrowed part 32c is less than the root circle diameter (D3) of the gear part 32b, and is also greater than the outer diameter (D2) of the second support part 32d (i.e., D3>D1>D2). Further, the outer diameter (D1) of the narrowed part 32c is less than the maximum diameter (D4) of the first support part 32a, and is also greater than the outer diameter (D2) of the second support part 32d (i.e., D4>D1>D2).

Thus, the narrowed part 32 is disposed between the gear part 32b to be meshed with the drive gear 31 and the clutch engaging part 32g to be coupled to the spool shaft 16, and the outer diameter D1 of the narrowed part 32c is set to be greater than the outer diameter D2 of the second support part 32d. Therefore, the pinion gear 32 is enhanced in its stiffness and its rotational transmission efficiency.

The clutch yoke 39, composing a part of the clutch control mechanism 19, is engaged with the narrowed part 32c. The clutch yoke 39 is configured to be located in an off-position illustrated in FIG. 4 when the clutch operating member 17 is set in the clutch-off position depicted with the dashed two-dotted line in FIG. 2. By contrast, the clutch yoke 39 is configured to be moved to an on-position illustrated in FIG. 5 together with the pinion gear 32, when the clutch operating member 17 is set in the clutch-on position depicted with the solid line in FIG. 2. It should be noted that the on-position illustrated in FIG. 5 is located on the left side of the off-position illustrated in FIG. 4 and is located closer to the spool 12 than the off-position. Thus, the clutch pin 20 is engaged with one of the engaging grooves 32f, and the clutch mechanism 13 is set in the clutch-on state. Therefore, the clutch mechanism 13 is mainly composed of the clutch pin 20 and the pinion gear 32. It should be noted that the clutch yoke 39 is urged to the on-position by a pair of coil springs 35 (see FIG. 6).

Thus, the pinion gear 32 composes a part of the rotation transmission mechanism 18. The pinion gear 32 is configured to be rotated in conjunction with the handle 2 for transmitting the rotation of the handle 2 to the spool 112 and be reciprocated in the direction of the spool shaft 16 in response to the operation of the clutch operating member 17. The outer diameter D1 of the narrowed part 32c is greater than the outer diameter D2 of the second support part 32d. Therefore, the pinion gear 32 is enhanced in its stiffness, and is less likely to be distorted. The pinion gear 32 thereby is less likely to be deformed (distorted or flexed), and is enhanced in its rotation transmission efficiency.

The second support part 32d is disposed on the other end of the body 32m. Specifically, the second support part 32d is disposed on the other end of the body 32m, and is supported by the reel unit 1 (the fourth boss 6d of the second side cover 6b) through the bearing 38b so as to be rotatable and axially movable. The bearing 38b is disposed together with the beating 24b supporting the spool shaft 16 within the fourth boss 6d, while a spacer 42 is interposed therebetween.

As illustrated in FIGS. 7 and 8, the plated coating 32e is formed on at least the outer peripheral surface of the first support part 32a. In the present exemplary embodiment, the plated coating 32e, as depicted with bold lines in FIG. 7 and depicted with dots in FIG. 8, is formed not only on the outer peripheral surface of the first support part 32a but also on the outer peripheral surface of the narrowed part 32c, that of the second support part 32d and that of the engaging grooves 32f.

Figure 9:
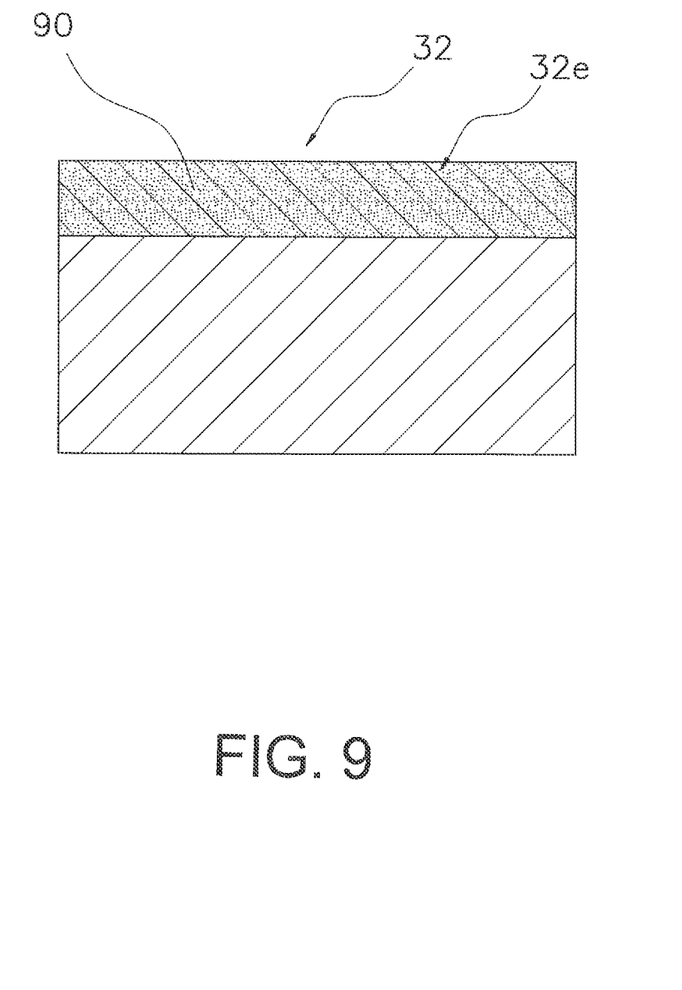
FIG. 9 is a schematic cross-sectional view of a plated film.

As illustrated in FIG. 9, the plated coating 32e is a fluororesin contained electroless nickel plated coating 90. The fluororesin contained electroless nickel plated coating 90 is a composite plated coating formed by substantially uniformly dispersing particles of fluororesin into nickel plating solution and causing eutectoid reactions between the particles. The fluororesin used for the fluororesin contained electroless nickel plated coating 90 is one selected from the group consisting of polytetrafluoroethylene (PTFE), polychlorotrifluoroethylene (PCTFE), polyvinylidene fluoride (PVDF), polyvinyl fluoride (PVF), perfluoroalkoxy (PFA), fluorinated ethylene propylene (FEP), polyethylene tetrafluoroethylene (ETFE) and polyethylene chlorotrifluoroethylene (ECTFE). The fluororesin is herein preferably polytetrafluoroethylene (PTFE).

In should be noted that FIG. 9 schematically depicts fluororesin with dots. The thickness of the fluororesin contained electroless nickel plated coating 90 falls in a range of 2 to 20 μm, for instance, and preferably falls in a range of 5 to 15 μm. The eutectic amount of fluororesin is, for instance, 1.5 to 10 weight percent of the entire plating solution.

In producing the pinion gear 32 thus structured, a tubular metal blank is machined for forming the first support part 32a (including the clutch engaging part 32g), the narrowed part 32c, the second support part 32d and the through hole 32h except for the gear part 32b to be machined by hobbing. The machined blank is then submerged into a plating tank, while the through hole 32h is closed. Subsequently, an electroless plating process is performed for the submerged blank. After the electroless plating processing, the gear part 32b is machined by hobbing.

<Drag Mechanism>

The drag force of the drag mechanism 21 is regulated by the star drag 3. As illustrated in FIGS. 3 and 6, the rotation of the handle 2 and the pressing force of the star drag 3 are transmitted to the drag mechanism 21 through an inner race 40a of the one-way clutch 40. The drag mechanism 21 includes the ratchet wheel 36 and the drag plate 37 (see FIG. 3). The drag plate 37 is coupled to the inner race 40a so as to be unitarily rotatable therewith. To make the drive gear 31 smoothly slide against adjacent members in drag actuation, a first drag washer 41a is mounted between the drag plate 37 and the drive gear 31, while a second drag washer 41b is mounted between the drive gear 31 and the ratchet wheel 36. The first and second drag washers 41a and 41b are made of either felt or graphite.

<Casting Control Mechanism>

As illustrated in FIGS. 4 and 5, the casting control mechanism 22 includes a first friction plate 51a, a second friction plate 51b and a brake cap 52. The first and second friction plates 51a and 51b abut both ends of the spool shaft 16 from axially outside of the spool shaft 16. The brake cap 52 is a member for regulating the abutting pressure of the first and second friction plates 51a and 51b against the spool shaft 16. The first friction plate 51a is disposed inside the brake cap 52. The brake cap 52 is screwed onto the outer peripheral surface of the fourth boss 6d. The second fiction plate 51b is mounted to the inside of the shaft strut portion 8b.

<Spool Brake Mechanism>

As illustrated in FIG. 5, the spool brake device 23 includes a rotary member 62, a plurality of (e.g., six) brake shoes 64, a brake drum 66 and a moving mechanism 68. The spool brake device 23 is mounted to the spool shaft 16 and the shaft strut portion 8b. The plurality of brake shoes 64 are elastically engaged with the rotary member 62 so as to be pivotable and detachable. The brake drum 66 is disposed radially inward of the brake shoes 64, while the outer peripheral surface thereof is contactable to the pivotable brake shoes 64. The moving mechanism 68 is capable of moving and positioning the brake dram 66 relatively to the brake shoes 64 in the axial direction of the spool shaft 16.

The rotary member 62 is a roughly circular member made of synthetic resin (e.g., polyamide resin, polyacetal resin, etc.), The rotary member 62 is fixed onto the spool shaft 16 by press-fitting. The rotary member 62 is axially positioned by the spool shaft 16. Further, the rotary member 62 is configured to be rotated in conjunction with the rotation of the spool 12, while being fixed onto the spool shaft 16. When the spool 12 is rotated, a centrifugal force acts on the brake shoes 64. Each brake shoe 64 thereby pivots about a pivot shaft 63c in the counterclockwise direction in FIG. 5. Then, the spool 12 is braked by friction between the brake shoes 64 and the brake drum 66. At this time, the braking force depends on the gravity center position and the pivot angle of each brake shoe 64 in the contact position. Therefore, the braking force is adjustable by causing the moving mechanism 68 to adjust the position of the brake drum 66. It should be noted that the position of the brake drum 66 is adjustable by turning an operating member 60.

In the pinion gear 32 of the dual-bearing reel 100 thus structured, the plated coating 32e (the fluororesin contained electroless nickel plated coating 90) is formed on the outer peripheral surface of the first support part 32a that is supported by the second boss 7g of the second side plate 7b of the reel unit 1 through the bearing 38a so as to be rotatable and axially movable. The surface roughness of the plated coating 32e (the fluororesin contained electroless nickel plated coating 90) is smaller than that of a surface processed by machining. Slide resistance can be thereby reduced between the first support part 32a and the inner peripheral surface of the bearing 38a. Thus, slide resistance can be herein reduced between the first support part 32a and the bearing 38a without using a member for reducing slide resistance such as a collar. As a result, the pinion gear 32, supported by the reel unit 1 through the bearing 38a, can be smoothly moved in the axial direction without increasing the size of the bearing 38a and deteriorating the strength of the pinion gear 32.

<Features>

The aforementioned exemplary embodiment can be expressed as follows.

(A) The pinion gear 32 of the present dual-bearing reel 100 is meshed with the drive gear 31 configured to transmit the rotation of the handle 2 to the spool 12. Further, the pinion gear 32 is configured to function as a clutch mechanism 13 by moving in the direction of the spool shaft 16, it should be noted that the handle 2 is rotatably mounted to the reel unit 1 of the dual-beating reel 100.

The present pinion gear 32 has the body 32m, the first support part 32a, the second support part 32d, the gear part 32b and the narrowed part 32c. The body 32m has a tubular shape. The body 32m enables the spool shaft 16 to be disposed in the inner peripheral part thereof. The first support part 32a is disposed on one end of the body 32m. The first support part 32a is supported by the reel unit 1 through the bearing 38a so as to be rotatable and axially movable. The second support part 32d is disposed on the other end of the body 32m. The second support part 32d is supported by the reel unit 1 through the bearing 38b so as to be rotatable and axially movable. The gear part 32b is disposed away from the first support part 32a at an interval and between the first support part 32a and the second support part 32d. The gear part 32b is meshable with the drive gear 31. The narrowed part 32c composes a part of the clutch mechanism 113. The narrowed part 32c is disposed between the first support part 32a and the gear part 32b. The narrowed part 32c herein has the outer diameter D1 that is greater than the outer diameter D2 of the second support part 32d and is less than the root circle diameter D3 of the gear part 32b.

The present pinion gear 32 is firmed such that the outer diameter D1 of the narrowed part 32c is greater than the outer diameter D2 of the second support part 32d. Hence, the narrowed part 32c is less likely to be deformed (distorted or flexed) even when the drive gear 31 is meshed with the gear part 32b between the first support part 32a and the second support part 32d. In other words, according to the present structure, the narrowed part 32c can have an enhanced stiffness. In addition, the gear feeling can be enhanced by inhibiting deformation (distortion or flexure) of the narrowed part 32c. Further, the pinion gear 32 is formed such that the outer diameter D1 of the narrowed part 32c is less than the root circle diameter D3 of the gear part 32b. Hence, the narrowed part 32c can avoid interfering with the gear part 32b, and the gear feeling can be enhanced.

(B) In the pinion gear 32 of the dual-bearing reel 100, the gear part 32b has the module M of greater than or equal to 0.1 and less than or equal to 0.4. The module M is defined by dividing the pitch circle diameter d by the number of teeth z.

In the present pinion gear 32, the gear part 32b is formed such that the module M falls in a range of greater than or equal to 0.1 and less than or equal to 0.4. In other words, the module M of the gear part 32b is much less than the module of the gear part of a well-known pinion gear. Thus, the gear part 32b of the present pinion gear 32 can be formed such that the root circle diameter D3 thereof is greater than the root circle diameter of the gear part of the well-known pinion gear. With the structure, the root circle diameter D3 of the gear part 32b can be prevented from interfering with the narrowed part 32c, even when the outer diameter D1 of the narrowed part 32c is greater than the outer diameter D2 of the second support part 32d. In other words, gear feeling can be enhanced.

(C) The present dual-beating reel 100 is a dual-bearing reel configured to forwardly reel out the fishing line. The dual-bearing reel 100 includes the reel unit it, the handle 2, the spool 12, the spool shall 16, the rotation transmission mechanism 18, the clutch mechanism 13, the bearing 38a and the bearing 38b. The handle 2 is rotatably mounted to the lateral part of the reel unit 1. The spool 12 for winding the fishing line is rotatably supported by the reel unit 1. The spool shaft 16 is mounted to the spool 12. The rotation transmission mechanism 18 is configured to transmit the rotation of the handle 2 to the spool 12. The rotation transmission mechanism 18 includes the drive gear 31 and the pinion gear 32.

The drive gear 31 is configured to be rotatable in conjunction with the handle 2. The pinion gear 32 is the one described in the aforementioned feature (A) or (B). The clutch mechanism 13 is enabled to be set in either the coupled state or the decoupled state. The coupled state causes the handle 2 and the spool 12 to be coupled to each other, whereas the decoupled state causes the handle 2 and the spool 12 to be decoupled from each other. The bearing 38a is mounted to the reel unit II. The bearing 38a supports the first support part 32a so as to make the first support part 32a rotatable and axially movable. The bearing 38b is mounted to the reel unit 1, The bearing 38b supports the second support part 32d so as to make the second support part 32d rotatable and axially movable.

According to the present dual-bearing reel 100, the pinion gear 32 is structured similarly to the one described in the aforementioned feature (A) or (B). Thus, the present dual-bearing reel 100 can achieve advantageous effects similar to those achieved by the aforementioned dual-bearing reel 100.

Other Exemplary Embodiments

One exemplary embodiment of the present invention has been explained above. However, the present invention is not limited to the aforementioned exemplary embodiment, and a variety of changes can be made without departing from the scope of the present invention. Especially, a plurality of exemplary embodiments and modifications described in the present specification can be arbitrarily combined on an as-needed basis.

(a) Members such as the clutch yoke and the clutch cam may be made of metal. Further, these members may be plated with a fluororesin contained material. The clutch yoke and the clutch cam are not herein particularly limited to specific shapes and types. Any suitable shapes and types are herein applicable to the clutch yoke and the clutch cam.

(b) In the aforementioned exemplary embodiment, the present invention has been explained by exemplifying a low-profile dual-bearing reel. However, the present invention is also applicable to a pinion gear to be embedded in a round dual-bearing reel, an electric reel or a single-bearing reel.

What is claimed is:
1. A pinion gear for a dual-bearing reel, the pinion gear configured to mesh with a drive gear and function as a clutch mechanism by moving in a direction of a spool shaft, the drive gear configured to transmit rotation of a handle to a spool, the handle rotatably mounted to a reel unit of the dual-bearing reel, the pinion gear comprising:
  a body having a tubular shape and an inner peripheral part, the inner peripheral part being configured to receive the spool shaft;
  a first support part disposed on a first end side of the body and being configured to be supported by the reel unit through a first bearing so as to be rotatable and axially movable;
  a second support part disposed on a second end side of the body and being configured to be supported by the reel unit through a second bearing so as to be rotatable and axially movable;
  a gear part disposed so as to be spaced from the first support part at an interval between the first support part and the second support part and being configured to mesh with the drive gear, the gear part including a module which is greater than or equal to 0.1 and less than or equal to 0.4, the module defined by dividing a pitch circle diameter of the gear part by a number of teeth of the gear part; and
  a clutch control part disposed between the first support part and the gear part, the clutch control part including an outer diameter greater than an outer diameter of the second support part and less than a root circle diameter of the gear part.

2. A dual-bearing reel being configured to forwardly reel out a fishing line, comprising:
a reel unit;
a handle being rotatably mounted to a lateral part of the reel unit;
a spool configured to wind the fishing line and being rotatably supported by the reel unit;
a spool shaft mounted to the spool;
a rotation transmission mechanism including a drive gear and the pinion gear recited in claim 1, the drive gear configured to be rotatable in conjunction with the handle, the pinion gear being configured to transmit rotation of the handle to the spool;
a clutch control mechanism configured to be set in either a coupled state or a decoupled state; the handle and the spool coupled to each other in the coupled state; the handle and the spool decoupled from each other in the decoupled state;
a first bearing mounted to the reel unit and supporting the first support part rotatably and movably in an axial direction; and
a second bearing mounted to the reel unit and supporting the second support part rotatably and movably in the axial direction.

3. The pinion gear for a dual-bearing reel according to claim 1, further comprising a plated coating disposed on an outer peripheral surface of the first support part.

* * * * *